Sept. 26, 1939.    K. J. W. FREITAG    2,174,187
DUAL DRIVE POWER SELECTOR
Filed April 3, 1939    2 Sheets-Sheet 1

INVENTOR.
KNUD J. W. FREITAG
BY
ATTORNEY.

Patented Sept. 26, 1939

2,174,187

UNITED STATES PATENT OFFICE 2,174,187

DUAL DRIVE POWER SELECTOR

Knud J. W. Freitag, Oakland, Calif., assignor to F. A. B. Manufacturing Co., Oakland, Calif., a corporation of Nevada Application April 3, 1939, Serial No. 265,680

6 Claims. (Cl. 180—22)

This invention relates to motor trucks in which dual driving axles are provided and each axle is driven through a separate drive shaft. The principal object of the invention is to provide an improved selective gear and clutch arrangement for controlling the power from the truck engine drive shaft to the dual axle drive shafts.

Features and advantages of the invention will appear in the following description and accompanying drawings:

Figure 1:
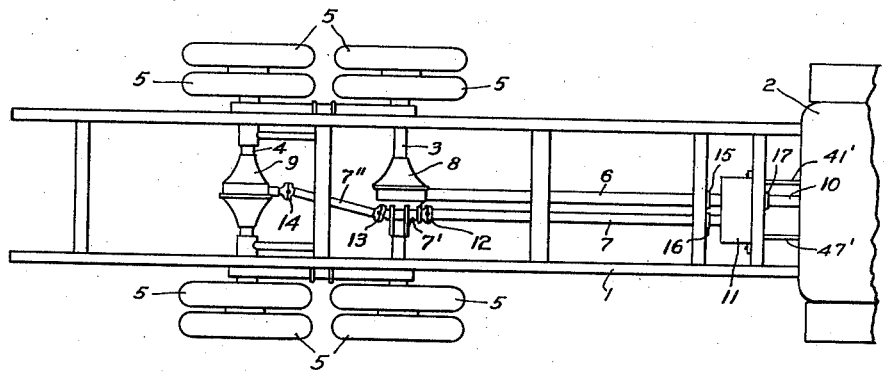
Figure 1 is a plan view of a motor truck chassis showing dual rear axles, each driven by a separate drive shaft from my improved power selector.
Figure 2:
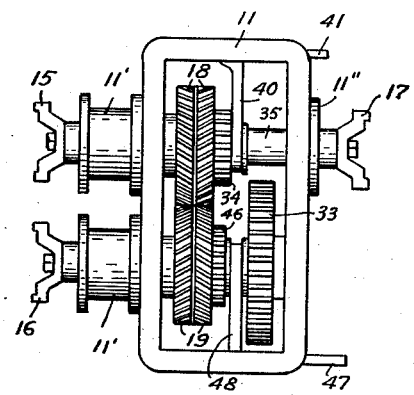
Figure 2 is an enlarged plan view of the power selector with top of case removed to show the general arrangement of gears and clutches within.
Figure 3:
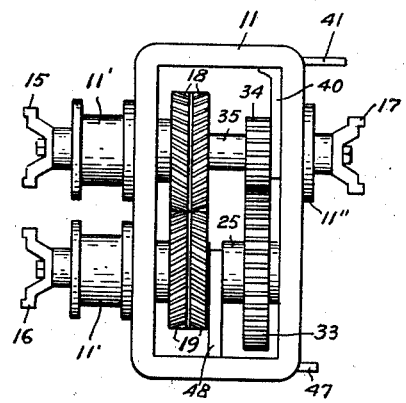
Figure 3 is a view similar to that of Figure 2 but showing a change in position of the clutches and gears.

Before describing the drawings in detail it may be said that in operation of heavy motor trucks having dual driven axles, my improved power selector which is positioned between the regular truck gear transmission and the two drive shafts which drive the dual rear axles, permits of driving but one of the rear axles by direct drive from the regular truck drive shaft of the truck gear transmission, or permits both rear axles to be simultaneously so driven, or permits both rear axles to be simultaneously driven at a still lower gear (generally about a three to one reduction through the selector) thus giving a total of about one-hundred to one when the regular transmission is dropped into low gear, but as such a very great gear reduction if applied to one axle would be in excess of what the axle could carry, means is provided to insure that it can only be used with both rear axles simultaneously, though as above stated the direct drive (even at the regular low gear) can be delivered through the selector to either one or both rear axles. Thus the driver has every variation of power at his command to meet any particular road and load combination which may be encountered in heavy mountain hauling.

In further detail the drawings show the frame of a motor truck at 1, its cab at 2, its rear dual axles 3, 4 each fitted with four road wheels 5, and each axle driven by a separate shaft 6, 7 through the usual differential gearing enclosed in the axle housings 8, 9.

The regular drive shaft of the truck is shown at 10, and between it and the dual shafts 6 and 7 is a housing 11 containing my improved power selector elements and through which the three shafts are variously connected.

The housing is suitably secured to the truck frame as indicated, and shaft 6 which drives axle 3 is central and in line with shaft 10, while shaft 7 is to one side of shaft 6 and connected through universal or flexible joints 12, 13, 14 and shorter sections 7', 7'' with the differential 9 of axle 4, short section 7' of the shaft being suitably rotatably supported on axle 3.

Shafts 6, 7 and 10 respectively connect to shafts projecting from the power selector by means of universal or flexible joints 15, 16, 17.

Within the housing 11 are two herringbone gears 18, 19, respectively in line with shafts 6 and 7 and constantly in mesh. Gear 18 is formed with an integral stub shaft 20 to the outer end of which flexible joint member 15 is secured for driving shaft 6, and the shaft is supported in bearings 21, 22 and protected by a suitable dust collar 23, while herringbone gear 19 is tightly bushed as at 24, but free on a shaft 25 which extends through opposite sides of the housing and is connected at one end to flexible joint member 16 for driving shaft 7 and fitted at the opposite end with a suitable collar 26 and lock nut 27 while bearings 28, 29, 30 revolvably support the shaft, and a dust collar 31 and cap 32 exclude ingress of dirt and grit.

Also freely mounted on shaft 25 is a large spur gear 33 which is adapted to be meshed with a spur pinion 34 slidably mounted on the splined portion 35 of a shaft 36 on the outer end of which flexible coupling member 17 is secured, and the inner end of which shaft is rotatably supported in a roller bearing 37 fitted within a counterbore in the forward side of herringbone gear 18, while a ball bearing 38 supports the other end of the shaft and a suitable dust collar 39 seals the same.

Pinion 34 and gear 33 may be of any desired ratio but for general heavy truck purposes are preferably about 2.34 to 1 so as to give a total reduction of 100 to 1 of the truck engine shaft when the low gear of the regular truck transmission is also used, and the pinion is slidable by means of a yoke 40 carried by a shift rod 41 along splines 35 to engage either gear 33 or the internal clutch gear teeth 55 formed in the rear side of herringbone gear 18. Suitable detents 42,

43, 44 are provided to hold the gear in either extreme or intermediate position.

Shaft 25 is provided with an intermediate enlarged splined section 45, slidably mounted on and engaging which is a double clutch pinion 46 which may be slid back and forth by means of a shifting rod 47 provided with a yoke 48. Clutch pinion 46 has spaced rows of clutch teeth 50, 51 at its opposite ends adapted respectively to engage internal teeth 52, 53 formed respectively within recesses in the confronting sides of gears 19 and 33.

Figure 4:
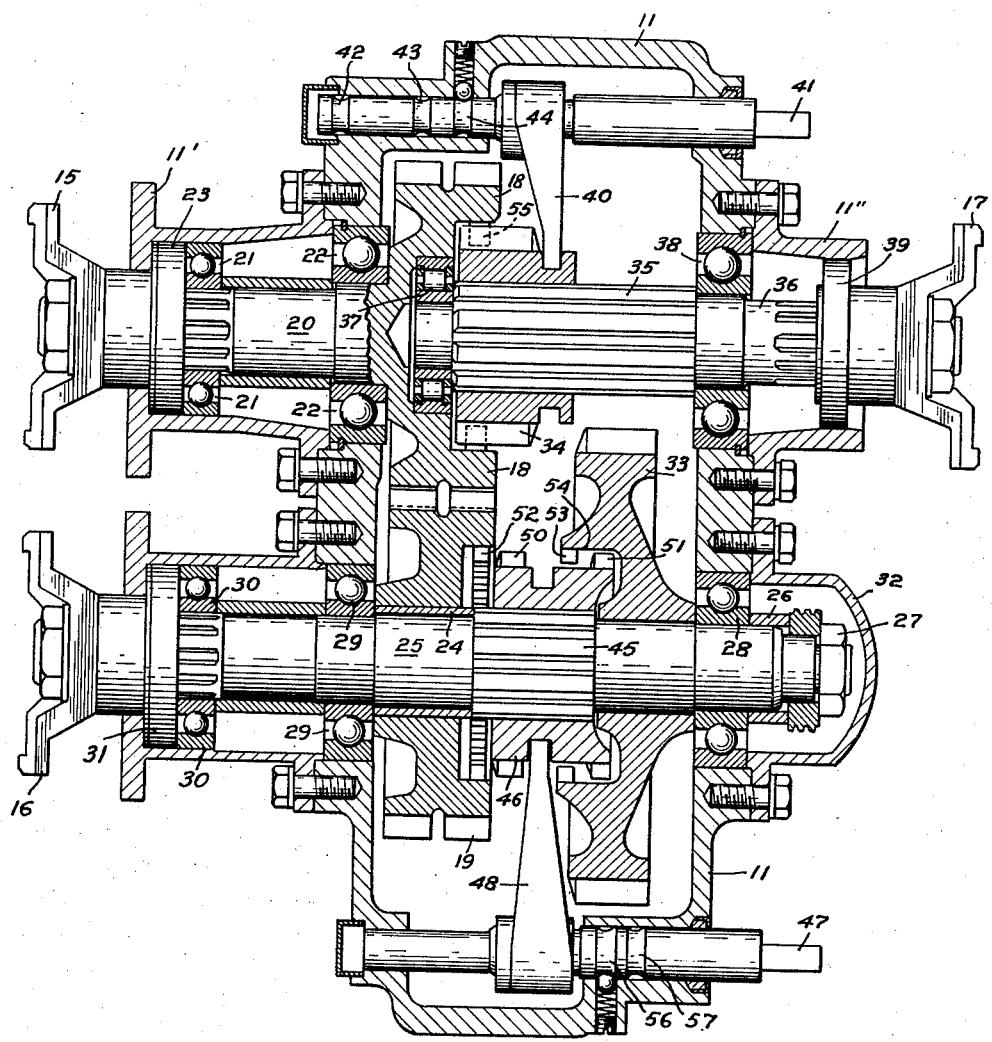
Figure 4 is an enlarged horizontal view of the gearing arrangement with most of the parts shown in section to more clearly reveal the mode of operation.

It should be noted that the recess 54 in gear 33 is relatively deep so that clutch pinion teeth 51 are disengaged from teeth 53 when the clutch pinion is slid into the recess to position shown in Figure 4 at the time when teeth 50 are also disengaged from teeth 52. Thus when the clutch is slid to the right as shown in the Figure 4 both gears 19 and 33 are free to idle on shaft 25, and when slid to the left both gears are locked to shaft 25 and to each other.

For accessibility and assembling, some parts of the housing are made separable as indicated by the parts 11′ and 11″ bolted to the main portion 11 as illustrated. Also the housing may be split in the usual manner for opening it or may have a detachable cover, all as well known in the art and requiring no special showing.

Shift rod 47 is provided with two detent recesses 56, 57 to hold clutch pinion 46 at either extreme position, and both rods 41 and 47 are connected to extensions 41′, 47′ leading to the drivers cab where they are connected to the usual operating levers not shown.

In operation, with the clutches positioned as shown in Figure 4, drive shaft 10 which is the regular transmission output shaft, or propeller shaft extending from the regular transmission gearing of the truck (not shown), is directly connected through clutch pinion 34 and internal clutch teeth 55 with gear 18 and hence with rear drive shaft 6 to drive the forward axle. As clutch pinion 46 is moved to the right it leaves gear 19 free on shaft 25 and therefore no power is being delivered to shaft 7, so that the rearmost set of wheels are not driving.

Upon shifting rod 47 and clutch pinion 46 to the left both sets of teeth 52 and 53 are engaged so as to lock both gears 19 and 33 to shaft 25 and thus also bring rear drive shaft 7 into action and divide the power between both rear axles and drive with both sets of wheels.

With clutch pinion 46 in position as just described, if pinion 34 is then moved to the extreme right, it will disengage gear 18 and engage gear 33 so that the power will then pass from shaft 36 by way of pinion 34 to gear 33, and thence by way of clutch pinion 46 to shaft 25, gear 19 to gear 18 and shaft 20, so that the reduction of speed occasioned by the meshing of pinion 34 with large gear 33 will be driving both rear axle shafts so as to split the power between them.

From the construction described, and by a consideration of Figure 4 it will be evident that with the selector arrangement the extra low gear can only be applied to both rear axles simultaneously and never to one only, though the direct power from power input shaft 10 may be applied to either one set of rear driving wheels or to both sets.

Since herringbone gears 18 and 19 are revolving in opposite directions the dual rear axle drive shafts 6 and 7 are also, and hence it is evident that the rearmost differential gearing in housing 9 must be of the opposite hand from that in housing 8.

A feature to be noted is, that in sliding pinion 34 from engagement with gear 18 to engagement with speed reducing or extra low gear 33, the pinion goes through an intermediate position (detent depression 43) where it is entirely free of both gears, this neutral position may be held for a moment till the truck loses speed and the pinion will then mesh with 33 without clashing— or the engine may be speeded up slightly for the same result.

Having thus described my improvement in selective gearing for dual axle motor truck driving, what I claim is:

1. In a motor vehicle provided with a regular gear transmission and having dual driving axles with separate drive shafts extending therefrom, a special transmission gearing assembly including an extra low gear positioned between the ends of said shafts and the power delivery shaft from the regular transmission of the vehicle, and means in said assembly for selectively connecting said delivery shaft with one or both said separate drive shafts for revolution all at the same speed, or for connecting said delivery shaft through said extra low gear to both of said separate shafts for driving them simultaneously, and means positively preventing the driving of one only of said separate shafts through said extra low gear.

2. In a motor vehicle having dual driving axles, means for selectively driving said axles from the transmission output shaft of the vehicle comprising differential gearing on each axle, independent dual drive shafts extending longitudinally of the vehicle from said differentials respectively, a special transmission gearing assembly including an extra low gear positioned between the ends of said dual drive shafts and the regular transmission output shaft of the vehicle, gear and clutch means in said assembly providing for selectively driving both dual shafts at the speed of said transmission output shaft, or directly driving one only of said dual shafts, or driving both dual shafts through said extra low gear, and means arranged to positively prevent driving one only of said dual shafts through said extra low gear.

3. In a motor vehicle having dual driving axles, means for selectively driving said axles from the transmission output shaft of the vehicle comprising differential gearing on each axle, independent dual drive shafts extending longitudinally of the vehicle from said differentials respectively, a special transmission gearing assembly including an extra low gear positioned between the ends of said dual drive shafts and the regular transmission output shaft of the vehicle, gear and clutch means in said assembly providing for selectively driving both dual shafts in reverse directions at the speed of said transmission output shaft, or directly driving one only of said dual shafts, or driving both dual shafts through said extra low gear, and means arranged to positively prevent driving one only of said dual shafts through said extra low gear, one of the differential gearings being of reverse hand to the other.

4. In a motor vehicle having dual driving axles connected to dual drive shafts, means for selectively driving said dual drive shafts from the regular transmission output shaft of the vehicle, comprising a special transmission gear assembly including an extra low gear, positioned between the ends of said dual drive shafts and the end of said output shaft, a first and a second shaft in said assembly connected respectively to said dual drive shafts and carrying respectively intermeshing first and second spur gears, said first gear fixed to said first shaft and the second gear free to revolve around said second shaft, a third shaft in said assembly connected with said output shaft to receive power therefrom, a pinion on said third shaft and a relatively large gear on said second shaft adapted to mesh with said pinion, and means for selectively connecting said third shaft directly to said first shaft, or for connecting said third shaft to said first and second shafts by way of said first and second gears, or for meshing said pinion to said large gear and connecting said large gear, second shaft and second gear rigidly together.

5. In a selective transmission gear assembly as set out in claim 4 the confronting sides of said second and said large gear being spaced apart and both formed with clutch elements, and a clutch member engaging said second shaft between said confronting sides formed and adapted for engaging and disengaging the clutch elements of both gears at the same time.

6. In a selective transmission gear assembly as set out in claim 4 the confronting sides of said second and said large gear being spaced apart and both formed with clutch teeth, and a clutch member engaging said second shaft between said confronting sides formed and adapted for engaging and disengaging the clutch teeth of both gears at the same time.

KNUD J. W. FREITAG.